(12) United States Patent
Sakai et al.

(10) Patent No.: US 11,613,594 B2
(45) Date of Patent: Mar. 28, 2023

(54) CROSSLINKED MOLDED ARTICLE AND PRODUCTION METHOD THEREOF

(71) Applicant: MITSUI CHEMICALS, INC., Tokyo (JP)

(72) Inventors: Tatsuya Sakai, Chiba (JP); Ryohei Saeki, Mobara (JP); Kiyohide Inomata, Ichihara (JP); Yoshiharu Kikuchi, Ichihara (JP); Kotaro Ichino, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 266 days.

(21) Appl. No.: 16/769,651

(22) PCT Filed: Dec. 13, 2018

(86) PCT No.: PCT/JP2018/045938
§ 371 (c)(1),
(2) Date: Jun. 4, 2020

(87) PCT Pub. No.: WO2019/124223
PCT Pub. Date: Jun. 27, 2019

(65) Prior Publication Data
US 2021/0179752 A1 Jun. 17, 2021

(30) Foreign Application Priority Data

Dec. 18, 2017 (JP) .............................. JP2017-242083

(51) Int. Cl.
| | |
|---|---|
| C08L 23/16 | (2006.01) |
| C08F 210/18 | (2006.01) |
| C08F 210/08 | (2006.01) |
| B29C 45/00 | (2006.01) |
| C08J 3/24 | (2006.01) |
| C08K 3/04 | (2006.01) |
| C08K 3/26 | (2006.01) |
| C08K 5/5419 | (2006.01) |
| B29K 19/00 | (2006.01) |
| B29K 105/00 | (2006.01) |
| B29K 105/24 | (2006.01) |

(52) U.S. Cl.
CPC ........ C08F 210/08 (2013.01); B29C 45/0001 (2013.01); C08J 3/243 (2013.01); C08K 3/04 (2013.01); C08K 3/26 (2013.01); C08K 5/5419 (2013.01); C08L 23/16 (2013.01); *B29K 2019/00* (2013.01); *B29K 2105/0014* (2013.01); *B29K 2105/0041* (2013.01); *B29K 2105/24* (2013.01); *C08F 210/18* (2013.01); *C08J 2323/20* (2013.01); *C08K 2003/265* (2013.01)

(58) Field of Classification Search
CPC ..... C08L 23/16; C08L 2312/08; C08F 210/18
See application file for complete search history.

(56) References Cited

U.S. PATENT DOCUMENTS

| | | | |
|---|---|---|---|
| 2,823,218 A | 2/1958 | Speier et al. | |
| 2,970,150 A | 1/1961 | Bailey | |
| 3,159,601 A | 12/1964 | Ashby | |
| 3,159,662 A | 12/1964 | Ashby | |
| 3,516,946 A | 6/1970 | Modic | |
| 3,775,452 A | 11/1973 | Karstedt | |
| 3,814,780 A | 6/1974 | Woodhall | |
| 5,530,076 A | 6/1996 | Eguchi et al. | |
| 6,114,460 A | 9/2000 | Hirakawa et al. | |
| 8,344,067 B2* | 1/2013 | Kawasaki | C08L 83/04 525/100 |
| 10,131,726 B2* | 11/2018 | Ichino | C08L 9/06 |
| 10,435,494 B2 | 10/2019 | Ichino et al. | |
| 2007/0292168 A1 | 12/2007 | Kuchiyama et al. | |
| 2016/0355622 A1 | 12/2016 | Ichino et al. | |
| 2018/0319917 A1 | 11/2018 | Ichino et al. | |

FOREIGN PATENT DOCUMENTS

| | | |
|---|---|---|
| EP | 2 267 071 A1 | 12/2010 |
| JP | H07-252419 A | 10/1995 |
| JP | H09-012893 A | 1/1997 |

(Continued)

OTHER PUBLICATIONS

Database WPI Week 200376, Thomson Scientific, GB, dated Apr. 25, 2007.
Second Chinese Office Action on CN Appl. Ser. No. 201880081380.2 dated Mar. 25, 2022 (14 pages).
International Preliminary Report on Patentability with Written Opinion dated Jun. 23, 2020 for corresponding International Patent Application No. PCT/JP2018/045938.

(Continued)

*Primary Examiner* — Rip A Lee
(74) *Attorney, Agent, or Firm* — Foley & Lardner LLP

(57) ABSTRACT

The present invention provides a crosslinked molded article having a lower compression set; and a method for producing a crosslinked molded article by injection molding, the method enabling shortening of one cycle in injection molding, the method being suitable for obtaining a crosslinked molded article having a lower compression set. The present invention relates to a method for producing a crosslinked molded article, comprising melt-kneading a polymer composition containing a polymer having a terminal double bond, a hydrosilyl group-containing compound (Y) having at least two hydrosilyl groups per molecule, a platinum-based catalyst (Z) for hydrosilicon crosslinking, and a reaction inhibitor (D), subjecting the polymer composition to injection molding in a mold, performing primary crosslinking in the mold, removing the primary-crosslinked molded article from the mold, and then performing secondary crosslinking in a heat medium.

5 Claims, No Drawings

(56) References Cited

FOREIGN PATENT DOCUMENTS

| | | |
|---|---|---|
| JP | H10-316722 A | 12/1998 |
| JP | 2002-333771 A | 11/2002 |
| JP | 2003-128851 A | 5/2003 |
| JP | 2006-290917 A | 10/2006 |
| JP | 2007-335570 A | 12/2007 |
| JP | 2014-148609 A | 8/2014 |
| JP | 2016-074824 A | 5/2016 |
| JP | 2017-019890 A | 1/2017 |
| JP | 2017-020806 A | 1/2017 |
| JP | 2018-130884 A | 8/2018 |
| WO | WO-2006/038556 A1 | 4/2006 |
| WO | WO 2015/122495 A1 * | 8/2015 ............ C08F 210/18 |
| WO | WO-2015/122495 A1 | 8/2015 |
| WO | WO-2017/068893 A1 | 4/2017 |

OTHER PUBLICATIONS

International Search Report dated Mar. 19, 2019 for corresponding International Patent Application No. PCT/JP2018/045938.
Jayle, Lignin et al. eds., New Technology in Plastic Forming and Processing, Defense Industry Press, 2006, p. 74.

* cited by examiner

CROSSLINKED MOLDED ARTICLE AND PRODUCTION METHOD THEREOF

RELATED APPLICATIONS

The present application claims priority under 37 U.S.C. § 371 to International Patent Application No. PCT/JP2018/045938, filed Dec. 13, 2018, which claims priority to and the benefit of Japanese Patent Application No. 2017-242083, filed on Dec. 18, 2017. The contents of these applications are hereby incorporated by reference in their entireties.

TECHNICAL FIELD

The present invention relates to a method for producing, through two-stage crosslinking, a crosslinked molded article which includes a composition containing a polymer having a terminal double bond, preferably a composition containing an ethylene/α-olefin/non-conjugated polyene copolymer.

BACKGROUND ART

Copolymer compositions of Patent Literature 1 obtained by hydrosilyl-crosslinking an ethylene/α-olefin/non-conjugated polyene random copolymer (hereinafter, sometimes abbreviated as EPDM) are superior in mechanical strength, heat aging resistance, compression set and bloom property to those obtained by sulfur vulcanization and peroxide crosslinking, and have characteristics such that continuous crosslinking is possible, and application of the copolymer compositions to seal components such as packings and gaskets is expected.

On the other hand, as a method for obtaining a molded material from a rubber composition, a method has been proposed in which an injection molding machine is used. Since it is necessary to crosslink a rubber composition at a high temperature, the molding time (one cycle) is extremely longer as compared to the time for obtaining a molded material of polyethylene, polypropylene or the like which is easily cooled and solidified in an injection molding mold.

For example, when the rubber composition described in Patent Literature 1 is used, it is difficult to obtain a crosslinked molded article by injection molding for the following reasons: the rubber composition has a short scorch time and a low crosslinking rate, and therefore use of an injection molding machine to obtain a crosslinked molded article leads to deterioration of processability in extrusion and injection molding due to, for example, the start of crosslinking in the injection molding machine; and it is necessary to hold a molded material in a mold for a relatively long time in order to perform crosslinking.

CITATION LIST

Patent Literature

Patent Literature 1: Japanese Patent Laid-Open No. 2006-290917

SUMMARY OF INVENTION

Technical Problem

The present invention provides a method for producing a crosslinked molded article by injection molding, the method enabling shortening of one cycle in injection molding and production of a crosslinked molded article having a lower compression set; and a crosslinked molded article having a lower compression set.

Solution to Problem

The present inventors have found that the above-described problems can be solved by combining a polymer having a terminal double bond so that excellent curing properties are exhibited when crosslinking is performed, preferably an ethylene/α-olefin/non-conjugated polyene copolymer described in this application, a crosslinking agent excellent in control of a crosslinking behavior as described in the present application, and a two-stage crosslinking method.

That is, the present invention relates to the following items [1] to [6].

[1] A method for producing a crosslinked molded article, comprising melt-kneading a polymer composition comprising a polymer having a terminal double bond, a hydrosilyl group-containing compound (Y) having at least two hydrosilyl groups per molecule, a platinum-based catalyst (Z) for hydrosilicon crosslinking, and a reaction inhibitor (D), subjecting the polymer composition to injection molding in a mold, performing primary crosslinking in the mold, removing the primary-crosslinked molded article from the mold, and then performing secondary crosslinking in a heat medium.

[2] The method for producing a crosslinked molded article according to [1], wherein the polymer having a terminal double bond is an ethylene/α-olefin/non-conjugated polyene copolymer (S) having structural units derived from ethylene (A), an α-olefin (B) having 3 to 20 carbon atoms, and a non-conjugated polyene (C) containing per molecule a total of two or more partial structures each selected from the group consisting of the structures of the following general formulae (I) and (II); and satisfying the following requirements (i) to (v).

[Chem. 1]

(i) a molar ratio of the ethylene/α-olefin is from 40/60 to 99.9/0.1.

(ii) a weight fraction of structural units derived from the non-conjugated polyene (C) is 0.07 wt % to 10 wt % based on 100 wt % of the ethylene/α-olefin/non-conjugated polyene copolymer (S).

(iii) a weight average molecular weight (Mw) of the ethylene/α-olefin/non-conjugated polyene copolymer (S), a weight fraction of structural units derived from the non-conjugated polyene (C) (weight fraction of (C) (wt %)), and a molecular weight of the non-conjugated polyene (C) (molecular weight of (C)) satisfy the following Formula (1).

$$4.5 \leq Mw \times \text{weight fraction of } (C)/100/\text{molecular weight of } (C) \leq 40 \quad \text{Formula (1)}$$

(iv) a ratio P of a complex viscosity $\eta^*_{(\omega=0.1)}$ (Pa·sec) at a frequency ω of 0.1 rad/s to a complex viscosity $\eta^*_{(\omega=100)}$ (Pa·sec) at a frequency ω of 100 rad/s ($\eta^*_{(\omega=0.1)}/\eta^*_{(\omega=100)}$) where the complex viscosities are obtained by linear viscoelasticity measurement (190° C.) using a rheometer, an intrinsic viscosity [η] and the weight fraction of structural units derived from the non-conjugated polyene (C) (weight fraction of (C)) satisfy the following Formula (2).

$$P/([\eta]^{2.9}) \leq \text{weight fraction } (C) \times 6 \qquad \text{Formula (2)}$$

(v) a number of long-chain branches per 1000 carbon atoms ($LCB_{1000C}$), which is obtained using 3D-GPC, and the natural logarithm of the weight average molecular weight (Mw) represented by [Ln (Mw)] satisfy the following Formula (3).

$$LCB_{1000C} \leq 1 - 0.07 \times \text{Ln (Mw)} \qquad \text{Formula (3)}$$

[3] The method for producing a crosslinked molded article according to [1] or [2], wherein the polymer composition comprises the hydrosilyl group-containing compound (Y) in an amount of 0.1 to 100 parts by mass, the platinum-based catalyst (Z) in an amount of 0.1 to 100000 ppm by weight and the reaction inhibitor (D) in an amount of 0.05 to 5 parts by mass based on 100 parts by mass of the polymer having a terminal double bond.

[4] The method for producing a crosslinked molded article according to any one of [1] to [3], wherein a melt-kneading temperature is in the range of 50 to 130° C., a temperature of the injection mold is in the range of 90 to 220° C., and a temperature of the heat medium is in the range of 90 to 220° C.

[5] The method for producing a crosslinked molded article according to any one of [1] to [4], wherein a time for the primary crosslinking is in the range of 0.5 to 60 seconds.

[6] A crosslinked molded article comprising: a polymer having a terminal double bond, a hydrosilyl group-containing compound (Y) having at least two hydrosilyl groups per molecule; a platinum-based catalyst (Z) for hydrosilicon crosslinking; and a reaction inhibitor (D), the crosslinked molded article satisfying the following requirement (I): Requirement (I): provided that (x) is a point at the center of the crosslinked molded article, (z) is a point, which is at the shortest distance from the point (x), on the surface of the crosslinked molded article, and (y) is a point at which a line segment connecting the point (x) and the point (z) is internally divided in a ratio of 2:1, a surface crosslinking density (A) of the crosslinked molded article from the point (z) to the point (y) and an internal crosslinking density (B) of the crosslinked molded article from the point (x) to the point (y) satisfy the following relational Formula (7).

$$(A)/(B) < 1.10 \qquad \text{Formula (7)}$$

Advantageous Effects of Invention

According to the present invention, the molding time (one cycle) in injection molding of a crosslinked molded article can be shortened, and a crosslinked molded article having a lower compression set can be provided.

DESCRIPTION OF EMBODIMENT

The present invention will be described in detail below.
The method for producing a crosslinked molded article according to the present invention includes melt-kneading a polymer composition containing polymer having a terminal double bond, preferably an ethylene/α-olefin/non-conjugated polyene copolymer (S), a hydrosilyl group-containing compound (Y) having at least two hydrosilyl groups per molecule, a platinum-based catalyst (Z) for hydrosilicon crosslinking, and a reaction inhibitor (D), subjecting the polymer composition to injection molding in a mold, performing crosslinking in the mold for a short time, and then performing crosslinking in a heat medium.

The polymer usable in the method for producing a molded article according to the present invention may be used without being limited as long as the polymer has a terminal double bond, and in particular, the ethylene/α-olefin/non-conjugated polyene copolymer (S) described below is preferable.

<Ethylene/α-Olefin/Non-Conjugated Polyene Copolymer (S)>

The ethylene/α-olefin/non-conjugated polyene copolymer (S) to be used in the method for producing an article according to the present invention has structural units derived from ethylene (A), an α-olefin (B) having 3 to 20 carbon atoms, and a non-conjugated polyene (C) containing per molecule a total of two or more partial structures each selected from the group consisting of the structures of the following general formulae (I) and (II).

[Chem. 2]

Such an ethylene/α-olefin/non-conjugated polyene copolymer (S) according to the present invention may have, in addition to the structural units derived from the compounds (A), (B) and (C), structural units derived from a non-conjugated polyene (D) containing per molecule only one partial structure selected from the group consisting of the structures of the above general formulae (I) and (II).

Examples of the α-olefin (B) having 3 to 20 carbon atoms include propylene, 1-butene, 1-pentene, 1-hexene, 4-methyl-1-pentene, 1-heptene, 1-octene, 1-decene, 1-dodecene, 1-tetradecene, 1-hexadecene and 1-eicosen. Among them, α-olefins having 3 to 8 carbon atoms, such as propylene, 1-butene, 1-hexene and 1-octene are preferable, with propylene being especially preferable. These α-olefins are preferable because the raw material cost is relatively low, the resulting ethylene/α-olefin/non-conjugated polyene copolymer has excellent mechanical properties, and furthermore a molded article having rubber elasticity can be obtained. These α-olefins may be used singly or in combination of the two or more kinds.

That is, the ethylene/α-olefin/non-conjugated polyene copolymer (S) according to the present invention contains structural units derived from at least one α-olefin (B) having 3 to 20 carbon atoms, and may contain structural units derived from two or more α-olefins (B) having 3 to 20 carbon atoms.

Examples of the non-conjugated polyene (C) containing per molecule a total of two or more partial structures each selected from the group consisting of the structures of the above general formulae (I) and (II) include 5-vinyl-2-norbornene (VNB), norbornadiene, 1,4-hexadiene and dicyclopentadiene. Preferably, the non-conjugated polyene (C) includes VNB among the above-mentioned compounds because of high accessibility, good hydrosilyl crosslinking reactivity and high possibility of improving the heat resistance of the polymer composition. More preferably, the non-conjugated polyene (C) is VNB. The non-conjugated polyene (C) may be used singly or in combination of the two or more kinds.

In addition to the structural units derived from ethylene (A), the α-olefin (B) having 3 to 20 carbon atoms and the non-conjugated polyene (C), the ethylene/α-olefin/non-conjugated polyene copolymer (S) of the present invention may contain, structural units derived from the non-conjugated polyene (D) containing per molecule only one partial structure selected from the group consisting of the structures of the above general formulae (I) and (II). Examples of the non-conjugated polyene (D) include 5-ethylidene-2-norbornene (ENB), 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene and 5-(1,2,3-trimethyl-4-pentenyl)-2-norbornene. Among them, ENB is preferable because of high accessibility, easy control of the crosslinking rate during hydrosilyl crosslinking and high possibility of obtaining good mechanical properties. The non-conjugated polyenes (D) may be used singly or in combination of the two or more kinds.

When the ethylene/α-olefin/non-conjugated polyene copolymer (S) according to the present invention contains structural units derived from the non-conjugated polyene (D) containing per molecule only one partial structure selected from the group consisting of the structures of the above general formulae (I) and (II), the ratio of the structural units is not particularly limited as long as the purpose of the present invention is not hindered, and the ratio of the structural units is typically about 0 to 20 wt %, preferably about 0 to 8 wt %, more preferably about 0.01 to 8 wt % in terms of a weight fraction (where the total weight fraction of compounds (A), (B), (C) and (D) is 100 wt %).

As described above, the ethylene/α-olefin/non-conjugated polyene copolymer (S) according to the present invention is a copolymer having structural units derived from ethylene (A), an α-olefin (B) having 3 to 20 carbon atoms, the non-conjugated polyene (C), and optionally the non-conjugated polyene (D), and satisfies the following requirements (i) to (v).

(i) The molar ratio of ethylene/α-olefin is from 40/60 to 99.9/0.1.
(ii) The weight fraction of structural units derived from the non-conjugated polyene (C) is 0.07 wt % to 10 wt %.
(iii) The weight average molecular weight (Mw) of the ethylene/α-olefin/non-conjugated polyene copolymer, the weight fraction of structural units derived from the non-conjugated polyene (C) (weight fraction of (C) (wt %)) and the molecular weight of the non-conjugated polyene (C) (molecular weight of (C)) satisfy the following Formula (1).

$$4.5 \leq Mw \times \text{weight fraction of } (C)/100/\text{molecular weight of } (C) \leq 40 \quad \text{Formula (1)}$$

(iv) The ratio P of the complex viscosity $\eta^*_{(\omega=0.1)}$ (Pa·sec) at a frequency ω of 0.1 rad/s to the complex viscosity $\eta^*_{(\omega=100)}$ (Pa·sec) at a frequency ω of 100 rad/s ($\eta^*_{(\omega=0.1)}/\eta^*_{(\omega=100)}$) where the complex viscosities are obtained by linear viscoelasticity measurement (190° C.) using a rheometer, the intrinsic viscosity [η] and the weight fraction of structural units derived from the non-conjugated polyene (C) (weight fraction of (C)) satisfy the following Formula (2).

$$P/([\eta]^{2.9}) \leq \text{weight fraction } (C) \times 6 \quad \text{Formula (2)}$$

(v) The number of long-chain branches per 1000 carbon atoms ($LCB_{1000C}$), which is obtained by using 3D-GPC, and the natural logarithm of the weight average molecular weight (Mw) represented by [Ln (Mw)] satisfy the following Formula (3).

$$LCB_{1000C} \leq 1 - 0.07 \times Ln (Mw) \quad \text{Formula (3)}$$

Herein, (i) to (v) above are also referred to as requirements (i) to (v), respectively. Herein, the "α-olefin having 3 to 20 carbon atoms" is also referred to simply as an "α-olefin".

<Requirement (i)>

The requirement (i) according to the present invention specifies that the molar ratio of ethylene/α-olefin in the ethylene/α-olefin/non-conjugated polyene copolymer (S) is from 40/60 to 99.9/0.1, and the molar ratio is preferably from 50/50 to 90/10, more preferably from 55/45 to 85/15, still more preferably from 55/45 to 78/22. Such an ethylene/α-olefin/non-conjugated polyene copolymer according to the present invention is preferable because a molded article obtained by hydrosilyl crosslinking has excellent rubber elasticity, and is excellent in mechanical strength and flexibility.

The amount of ethylene (content of structural units derived from ethylene (A)) and the amount of the α-olefin (content of structural units derived from the α-olefin (B)) in the ethylene/α-olefin/non-conjugated polyene copolymer (S) can be determined by $^{13}$C-NMR.

<Requirement (ii)>

The requirement (ii) specifies that in the ethylene/α-olefin/non-conjugated polyene copolymer (S) according to the present invention, the weight fraction of structural units derived from the non-conjugated polyene (C) is in the range of 0.07 wt % to 10 wt % based on 100 wt % of the ethylene/α-olefin/non-conjugated polyene copolymer (S) (i.e. based on 100 wt % of the total weight fraction of all structural units). The weight fraction of structural units derived from the non-conjugated polyene (C) is preferably 0.1 wt % to 8.0 wt %, more preferably 0.5 wt % to 5.0 wt %.

It is preferable that the ethylene/α-olefin/non-conjugated polyene copolymer (S) according to the present invention satisfy the requirement (ii) because the crosslinked molded article according to the present invention has a sufficient hardness, and is excellent in mechanical properties, and when hydrosilyl crosslinking is performed, a high crosslinking rate is exhibited, and the ethylene/α-olefin/non-conjugated polyene copolymer (S) according to the present invention becomes suitable for production of a crosslinked molded article.

The amount of the non-conjugated polyene (C) (content of structural units derived from the non-conjugated polyene (C)) in the ethylene/α-olefin/non-conjugated polyene copolymer (S) can be determined by $^{13}$C-NMR.

<Requirement (iii)>

The requirement (iii) specifies that in the ethylene/α-olefin/non-conjugated polyene copolymer (S) according to the present invention, the weight average molecular weight (Mw) of the ethylene/α-olefin/non-conjugated polyene copolymer, the weight fraction of structural units derived from the non-conjugated polyene (C) (weight fraction of (C): wt %) in the copolymer, and the molecular weight of the non-conjugated polyene (C) (molecular weight of (C)) satisfy the following relational Formula (1).

$$4.5 \leq Mw \times \text{weight fraction of } (C)/100/\text{molecular weight of } (C) \leq 40 \quad \text{Formula (1)}$$

It is preferable that the ethylene/α-olefin/non-conjugated polyene copolymer (S) according to the present invention satisfy the requirement (iii) because the content of structural units derived from the non-conjugated polyene (C) such as VNB is appropriate, and sufficient hydrosilyl crosslinking performance is exhibited, and when a crosslinked molded article is produced using the ethylene/α-olefin/non-conjugated polyene copolymer composition according to the present invention, an excellent crosslinking rate is exhibited, and the molded article after crosslinking has excellent mechanical properties.

More preferably, the ethylene/α-olefin/non-conjugated polyene copolymer (S) according to the present invention satisfies the following relational Formula (1').

$$4.5 \leq Mw \times \text{weight fraction of } (C)/100/\text{molecular weight of } (C) \leq 35 \quad \text{Formula (1')}$$

The weight average molecular weight (Mw) of the ethylene/α-olefin/non-conjugated polyene copolymer (S) can be determined as a polystyrene equivalent value measured gel permeation chromatography (GPC).

The ethylene/α-olefin/non-conjugated polyene copolymer (S) according to the present invention has an appropriate crosslinking degree when the value of "Mw×weight fraction of (C)/100/molecular weight of (C)" satisfies the Formula (1) or (1'), and use of the copolymer enables production of a molded article having excellent and well-balanced mechanical properties and heat aging resistance. When the value of "Mw×weight fraction of (C)/100/molecular weight of (C)" is excessively small, the crosslinking rate may decrease due to insufficient crosslinking performance at the time of performing hydrosilyl crosslinking, and when the value of "Mw×weight fraction of (C)/100/molecular weight of (C)" is excessively large, excessive crosslinking may occur, leading to deterioration of mechanical properties.

<Requirement (iv)>

The requirement (iv) specifies that in the ethylene/α-olefin/non-conjugated polyene copolymer (S) according to the present invention, the ratio P of the complex viscosity $\eta^*_{(\omega=0.1)}$ (Pa·sec) at a frequency ω of 0.1 rad/s to the complex viscosity $\eta^*_{(\omega=100)}$ (Pa·sec) at a frequency ω of 100 rad/s ($\eta^*_{(\omega=0.1)}/\eta^*_{(\omega=100)}$) where the complex viscosities are obtained by linear viscoelasticity measurement (190° C.) using a rheometer, the intrinsic viscosity [η] and the weight fraction of structural units derived from the non-conjugated polyene (C) (weight fraction of (C): wt %) satisfy the following Formula (2).

$$P/([\eta]^{2.9}) \leq \text{weight fraction } (C) \times 6 \quad \text{Formula (2)}$$

Here, the ratio P of the complex viscosity $\eta^*_{(\omega=0.1)}$ at a frequency ω of 0.1 rad/s to the complex viscosity $\eta^*_{(\omega=100)}$ at a frequency ω of 100 rad/s ($\eta^*_{(\omega=0.1)}/\eta^*_{(\omega=100)}$) indicates frequency dependency of viscosity, and the value of $P/([\eta]^{2.9})$ on the left side of Formula (2) tends to be large when there are many long-chain branches, although depending on, for example, short-chain branches and the molecular weight. In general, in an ethylene/α-olefin/non-conjugated polyene copolymer, the number of long-chain branches increases as the content of structural units derived from the non-conjugated polyene increases, but it is considered that the ethylene/α-olefin/non-conjugated polyene copolymer (S) according to the present invention can satisfy the Formula (2) because there is a smaller number of long-chain branches as compared to a known ethylene/α-olefin/non-conjugated polyene copolymer. In the present invention, the P value is a ratio (η*ratio) determined from a complex viscosity at 0.1 rad/s and a complex viscosity at 100 rad/s, where the complex viscosities are determined by performing measurement under the condition of 190° C., a strain of 1.0% and different frequencies using a viscoelasticity measuring apparatus (Ares manufactured by Rheometric Scientific, Inc.).

Preferably, the ethylene/α-olefin/non-conjugated polyene copolymer (S) according to the present invention satisfies the following Formula (2').

$$P/([\eta]^{2.9}) \leq \text{weight fraction } (C) \times 5.7 \quad \text{Formula (2')}$$

The intrinsic viscosity [η] is a value measured in decalin at 135° C.

<Requirement (v)>

The requirement (v) specifies that in the ethylene/α-olefin/non-conjugated polyene copolymer (S) according to the present invention, the number of long-chain branches per 1000 carbon atoms ($LCB_{1000C}$) which is obtained using 3D-GPC, and the natural logarithm of the weight average molecular weight (Mw) represented by [Ln (Mw)] satisfy the following Formula (3).

$$LCB_{1000C} \leq 1 - 0.07 \times Ln (Mw) \quad \text{Formula (3)}$$

The above Formula (3) specifies the upper limit of the content of long-chain branches per unit number of carbon atoms in the ethylene/α-olefin/non-conjugated polyene copolymer (S).

Such an ethylene/α-olefin/non-conjugated polyene copolymer (S) is preferable because the ratio of long-chain branches contained is low, excellent curing properties are exhibited when hydrosilyl crosslinking is performed, and a molded article obtained using the copolymer is excellent in heat aging resistance.

Preferably, the ethylene/α-olefin/non-conjugated polyene copolymer (S) according to the present invention satisfies the following Formula (3').

$$LCB_{1000C} 1 - 0.071 \times Ln (Mw) \quad \text{Formula (3')}$$

Here, the molecular weight (Mw) and the number of long-chain branches per 1000 carbon atoms ($LCB_{1000C}$) can be determined by a structural analysis method using 3D-GPC. Herein, specifically, Mw and $LCB_{1000C}$ are determined in the following manner.

The absolute molecular weight distribution is determined using a 3D-high-temperature GPC apparatus (Model PL-GPC220 manufactured by Polymer Laboratories Ltd.), and simultaneously, the intrinsic viscosity is determined with a viscometer. Basic measurement conditions are as follows.

Detectors: differential refractometer/built-in GPC apparatus two-angle light scattering photometer (Model PD2040 manufactured by Precision Detectors, Inc.)

bridge-type viscometer (Model PL-BV400 manufactured by Polymer Laboratories Ltd.)

Columns: two TSKgel $GMH_{HR}$-H(S)HTs and one TSKgel $GMH_{HR}$-M(S) (each having an inner diameter of 7.8 mmφ and a length of 300 mm)

Temperature: 140° C.

Mobile phase: 1,2,4-trichlorobenzene (containing 0.025% of BHT)

Amount injected: 0.5 mL

Sample concentration: ca 1.5 mg/mL

Sample filtration: filtration with sintered filter having a pore size of 1.0 μm

The dn/dc value necessary for determination of the absolute molecular weight is determined for each sample from the dn/dc value (0.053) of standard polystyrene (molecular weight: 190000) and the response intensity of the differential refractometer per unit injection mass.

On the basis of a relationship between the intrinsic viscosity obtained with the viscometer and the absolute molecular weight obtained with the light scattering photometer, the long-chain branch parameter g'i for each eluted component is calculated from the Formula (v-1).

[Math. 1]

$$g'^i = \frac{[\eta]^{i,br}}{[\eta]^{i,lin}} \quad (v-1)$$

$[\eta]^{i,br}$: Measured intrinsic viscosity of the ith slice component $[\eta]^{i,lin}$: intrinsic viscosity with the assumption that the ith slice component has no long-chain branch structure, and shows only short-chain branch structures.

Here, the relational formula of $[\eta]=KM^v$ (v=0.725) is applied.

The averages are calculated as g' from the following formulae (v-2), (v-3) and (v-4). The trendline based on which the ith slice component has only short-chain branch structures is determined for each sample.

[Math. 2]

$$\text{Number average long-chain branch parameter } g'^n = \frac{\sum (C^i/M^i \times g'^i)}{\sum (C^i/M^i)} \quad (v-2)$$

$$\text{Weight average long-chain branch parameter } g'^w = \frac{\sum (C^i \times g'^i)}{\sum C^i} \quad (v-3)$$

$$\text{z-average long-chain branch parameter } g'^z = \frac{\sum (C^i \times M^{i2} \times g'^i)}{\sum (C^i \times M^{i2})} \quad (v-4)$$

$C^i$: Concentration for each eluted component $M^i$: Absolute molecular weight for each eluted component Further, the number of branch points per molecular chain (BrNo), the number of long-chain branches per 1000 carbon atoms ($LCB_{1000C}$) and the branching degree per unit molecular weight (λ) are calculated with the parameter g'w. The value of BrNo is calculated from the Zimm-Stockmayer formula (v-5), and the values of $LCB_{1000C}$ and λ are calculated from formulae (v-6) and (v-7). The parameter g is a long-chain branch parameter determined from the radius of inertia (Rg), and there is the following simple correlation between the parameter g and the parameter g' determined from the intrinsic viscosity. For ε in the formula, various values have been proposed depending on shapes of molecules. Here, calculation is performed with the assumption of ε=1 (i.e. g'=g).

[Math. 3]

$$g'^w = \frac{1}{\sqrt{\sqrt{1 + BrNo/7} + 4 \times BrNo/9\pi}} \quad (v-5)$$

$$\lambda = BrNo/M \quad (v-6)$$

$$LCB_{1000C} = \lambda \times 14000 \quad (v-7)$$

The numeral 14000 in formula (v-7) denotes the total molecular weight of 1000 methylene ($CH_2$) units.

The ethylene/α-olefin/non-conjugated polyene copolymer (S) according to the present invention has an intrinsic viscosity [η] of preferably 0.1 to 5 dL/g, more preferably 0.5 to 5.0 dL/g, still more preferably 0.9 to 4.0 dL/g.

The ethylene/α-olefin/non-conjugated polyene copolymer (S) according to the present invention has a weight average molecular weight (Mw) of preferably 10,000 to 600,000, more preferably 30,000 to 500,000, still more preferably 50,000 to 400,000.

Preferably, both the intrinsic viscosity [η] and the weight average molecular weight (Mw) of the ethylene/α-olefin/non-conjugated polyene copolymer (S) according to the present invention are in the above-described ranges.

In the ethylene/α-olefin/non-conjugated polyene copolymer (S) according to the present invention, it is preferable that the non-conjugated polyene (C) include VNB, and it is more preferable that the non-conjugated polyene (C) be VNB. That is, in the above-described Formulae (1) and (2), Formula (4) as described later and the like, "weight fraction of (C)" is preferably "weight fraction of VNB" (wt %).

It is preferable that as described above, the ethylene/α-olefin/non-conjugated polyene copolymer (S) according to the present invention contain, in addition to structural units derived from the compounds (A), (B) and (C), structural units derived from the non-conjugated polyene (D) containing per molecule only one partial structure selected from the group consisting of the structures of the above general formulae (I) and (II), with the non-conjugated polyene (D) content being 0 wt % to 20 wt % in terms of a weight fraction (where the total weight fraction of the compounds (A), (B), (C) and (D) is 100 wt %). In this case, it is preferable to satisfy the following requirement (vi).

(Requirement (vi))

The weight average molecular weight (Mw) of the ethylene/α-olefin/non-conjugated polyene copolymer (S), the weight fraction of structural units derived from the non-conjugated polyene (C) (weight fraction of (C) (wt %)), the weight fraction of structural units derived from the non-conjugated polyene (D) (weight fraction of (D) (wt %)), the molecular weight of the non-conjugated polyene (C) (molecular weight of (C)), and the molecular weight of the non-conjugated polyene (D) (molecular weight of (D)) satisfy the following Formula (4).

4.5≤Mw×{(weight fraction of (C)/100/molecular weight of (C))+(weight fraction of (D)/100/molecular weight of (D))}≤4.5    Formula (4)

The Formula (4) specifies the content of the non-conjugated diene (total of (C) and (D)) per molecule of the copolymer.

It is preferable that the ethylene/α-olefin/non-conjugated polyene copolymer (S) containing structural units derived from the non-conjugated polyene (D) satisfy the Formula (4) because a hydrosilyl-crosslinked molded article obtained from the ethylene/α-olefin/non-conjugated polyene copolymer (S) composition has excellent mechanical properties and heat aging resistance.

When the requirement (vi) is not satisfied, for example when the value of "Mw×{(weight fraction of (C)/100/molecular weight of (C))+(weight fraction of (D)/100/molecular weight of (D))}" in the Formula (4) is excessively small, i.e. the content of the non-conjugated diene is excessively low, it may be impossible to achieve adequate mechanical properties because sufficient crosslinking is not performed. When the content of the non-conjugated diene is excessively high, mechanical properties may be deteriorated due to excessive hydrosilyl crosslinking, and heat aging resistance may be deteriorated.

<Requirement (vii)>

The ethylene/α-olefin/non-conjugated polyene copolymer (S) according to the present invention is not particularly limited, and it is preferable that the complex viscosity $\eta^*_{(\omega=0.01)}$ (Pa·sec) at a frequency ω of 0.01 rad/s, the complex viscosity $\eta^*_{(\omega=10)}$ (Pa·sec) at a frequency ω of 10 rad/s, and the apparent iodine value derived from the non-conjugated polyene (c) satisfy the following Formula (5), where the complex viscosities are obtained by linear viscoelasticity measurement (190° C.) using a rheometer.

Log $\{\eta^*_{(\omega=0.01)}\}$/Log $\{\eta^*_{(\omega=10)}\}$≤0.0753×{apparent iodine value derived from non-conjugated polyene(C)}+1.42    Formula (5)

Here, the complex viscosity $\eta^*_{(\omega=0.01)}$ and the complex viscosity $\eta^*_{(\omega=10)}$ in the requirement (vi) are determined in the same manner as in the case of the complex viscosity $\eta^*_{(\omega=0.1)}$ and the complex viscosity $\eta^*_{(\omega=100)}$ except that the measurement frequencies are changed.

The apparent iodine value derived from the non-conjugated polyene (C) is determined from the following Formula.

apparent iodine value derived from (C)=weight fraction of (C)×253.81/molecular weight of (C)

In the above Formula (5), the left side member represents shear rate dependency giving an index of the amount of long-chain branching, and the right side member represents an index of the content of non-conjugated polyene (C) which has not been consumed as long-chain branches during polymerization. It is preferable that the requirement (vii) and the above Formula (5) be satisfied because the degree of long-chain branching is not excessively high. On the other hand, when the above Formula (5) is not satisfied, it is apparent that the ratio of non-conjugated polyene (C) consumed for formation of long-chain branches to copolymerized non-conjugated polyene (C) is high.

Further, it is preferable that the ethylene/α-olefin/non-conjugated polyene copolymer (S) according to the present invention contain a sufficient amount of structural units derived from the non-conjugated polyene (C), and it is preferable that the weight fraction of structural units derived from the non-conjugated polyene (C) (weight fraction of (C) (wt %)) in the copolymer, and the weight average molecular weight (Mw) of the copolymer satisfy the following formula (6).

6−0.45×Ln (Mw)≤weight fraction of (C)≤10    Formula (6)

In the ethylene/α-olefin/non-conjugated polyene copolymer (S) according to the present invention, the number of structural units derived from the non-conjugated polyene (C) represented by $(n_C)$, per weight average molecular weight (Mw), is preferably 6 or more, more preferably 6 or more and 40 or less, still more preferably 7 or more and 39 or less, furthermore preferably 10 or more and 38 or less.

Such an ethylene/α-olefin/non-conjugated polyene copolymer (S) according to the present invention contains a sufficient amount of structural units derived from the non-conjugated polyene (C) such as VNB, has a low content of long-chain branches, is excellent in curing properties in crosslinking performed using a peroxide, has good moldability, and is excellent in balance of physical properties such as mechanical properties, and particularly excellent in heat aging resistance.

In the ethylene/α-olefin/non-conjugated polyene copolymer (S) according to the present invention, the number of structural units derived from the non-conjugated polyene (D) which represented by $(n_D)$, per weight average molecular weight (Mw), is preferably 29 or less, more preferably 10 or less, still more preferably less than 1.

Such an ethylene/α-olefin/non-conjugated polyene copolymer (S) according to the present invention is preferable because the content of structural units derived from the non-conjugated polyene (D) such as ENB is reduced to the extent that the purpose of the present invention is not hindered, post-crosslinking hardly occurs, and sufficient heat aging resistance is exhibited.

Here, the number of structural units derived from the non-conjugated polyene (C) represented by $(n_C)$ or the number of structural units derived from the non-conjugated polyene (D) represented by $(n_D)$, per weight average molecular weight (Mw), in the ethylene/α-olefin/non-conjugated polyene copolymer (S) can be determined in accordance with the following formulae from the molecular weight of the non-conjugated polyene (C) or (D), the weight fraction of structural units derived from the non-conjugated polyene (C) or (D) in the copolymer (weight fraction of (C) or (D) (wt %)) and the weight average molecular weight (Mw) of the copolymer.

$(n_C)$=(Mw)×{weight fraction of (C)/100}/molecular weight of non-conjugated polyene (C)

$(n_D)$=(Mw)×{weight fraction of (D)/100}/molecular weight of non-conjugated polyene (D)

It is preferable that in the ethylene/α-olefin/non-conjugated polyene copolymer (S) according to the present invention, the numbers of structural units derived, respectively, from the non-conjugated polyene (C) and (D) $(n_C)$ and $(n_D)$, per weight average molecular weight (Mw), both fall within the above-described ranges because the ethylene/α-olefin/non-conjugated polyene copolymer (S) has a low content of long-chain branches, the crosslinking rate in hydrosilyl crosslinking of the composition containing the ethylene/α-olefin/non-conjugated polyene copolymer (S) is high, the resulting crosslinked molded article is excellent in balance of physical properties such as mechanical properties, post-crosslinking hardly occurs, and particularly excellent heat aging resistance is exhibited.

<Production of Ethylene/α-Olefin/Non-Conjugated Polyene Copolymer (S)>

The ethylene/α-olefin/non-conjugated polyene copolymer (S) according to the present invention is a copolymer obtained by copolymerizing a monomer including ethylene (A), the α-olefin (B) having 3 to 20 carbon atoms, the non-conjugated polyene (C) containing per molecule a total of two or more partial structures each selected from the group consisting of the structures of the above general formulae (I) and (II), and optionally the non-conjugated polyene (D) containing per molecule a total of only one partial structure selected from the group consisting of the structures of the above general formulae (I) and (II).

The ethylene/α-olefin/non-conjugated polyene copolymer (S) according to the present invention may be produced by any method as long as the requirements (i) to (v) are satisfied, and the copolymer (S) is preferably one obtained by copolymerizing monomers in the presence of a metallocene compound, more preferably one obtained by copolymerizing monomers in the presence of a catalyst system containing a metallocene compound.

Specifically, the ethylene/α-olefin/non-conjugated polyene copolymer (S) according to the present invention can be produced by employing, for example, a method using a metallocene catalyst as described in International Publication No. WO 2015/122495.

<Hydrosilyl Group-Containing Compound (Y)>

The hydrosilyl group-containing compound (Y) according to the present invention acts as a crosslinking agent by reacting with a polymer having a terminal double bond, such as an ethylene/α-olefin/non-conjugated polyene copolymer (S). The hydrosilyl group-containing compound (Y) has been produced and commercially available. The structure of the hydrosilyl group-containing compound (Y) is not limited, and for example, any of resinous materials of linear, cyclic and branched structures or three-dimensional network structure, which have been heretofore produced and sold, can be used, and the hydrosilyl group-containing compound (Y) for use in the present invention is required to contain at least two hydroxyl groups per molecule.

For the hydrosilyl group-containing compound (Y), typically a compound represented by the following general composition formula may be used.

$R^4{}_b H_c SiO_{(4-b-c)/2}$

In the above general composition formula, $R^4$ is a substituted or unsubstituted monovalent hydrocarbon group having 1 to 10 carbon atoms, particularly 1 to 8 carbon atoms, where an aliphatic unsaturated bond is not included. Examples of the monovalent hydrocarbon group include alkyl groups ranging from a methyl group or ethyl group to a nonyl group or decyl group and including isomers such as n-, iso-, sec- and tert-alkyls; phenyl groups; and halogen-substituted alkyl groups such as a trifluoropropyl group. Among them, a methyl group, an ethyl group, a propyl group, a phenyl group and a trifluoropropyl group are preferable, with a methyl group being especially preferable.

In the above general composition formula, b satisfies 0≤b<3, preferably 0.6<b<2.2, particularly preferably 1.5≤b≤2, and c satisfies 0<c≤3, preferably 0.002≤c<2, particularly preferably 0.01≤c≤1, and b+c satisfies 0<b+c≤3, preferably 1.5<b+c≤2.7.

The hydrosilyl group-containing compound (Y) according to the present invention is an organohydrogenpolysiloxane in which the number of silicon atoms per molecule is preferably 2 to 1000, especially preferably 2 to 300, most preferably 4 to 200. Specific examples thereof include siloxane oligomers such as 1,1,3,3-tetramethyldisiloxane, 1,3,5,7-tetramethyltetracyclosiloxane and 1,3,5,7,8-pentamethylpentacyclosiloxane, methylhydrogenpolysiloxanes blocked at both molecular chain terminals by trimethylsiloxy groups, dimethylsiloxane-methylhydrogensiloxane copolymers blocked at both molecular chain terminals by trimethylsiloxy groups, methylhydrogenpolysiloxanes blocked at both molecular chain terminals by silanol groups, dimethylsiloxane-methylhydrogensiloxane copolymers blocked at both molecular chain terminals by silanol groups, dimethylpolysiloxanes blocked at both molecular chain terminals by dimethylhydrogensiloxy groups, methylhydrogenpolysiloxanes blocked at both molecular chain terminals by dimethylhydrogensiloxy groups, dimethylsiloxane-methylhydrogensiloxane copolymers blocked at both molecular chain terminals by dimethylhydrogensiloxy groups, and silicone resins including $R^2{}_2(H)SiO_{1/2}$ units and $SiO_{4/2}$ units and optionally containing $R^2{}_3SiO_{1/2}$ units, $R^2{}_2SiO_{2/2}$ units, $R^2(H)SiO_{2/2}$ units, $(H)SiO_{3/2}$ units or $R^2SiO_{3/2}$ units.

Examples of the methylhydrogenpolysiloxanes blocked at both molecular chain terminals by trimethylsiloxy groups include compounds represented by the following formula, and compounds represented by the following formula with the proviso that some or all of methyl groups are replaced by ethyl groups, propyl groups, phenyl groups, trifluoropropyl groups or the like.

$(CH_3)_3SiO\text{—}(\text{—}SiH(CH_3)\text{—}O\text{—})_d\text{—}Si(CH_3)_3$ (wherein d is an integer of 2 or more).

Examples of the dimethylsiloxane-methylhydrogensiloxane copolymers blocked at both molecular chain terminals by trimethylsiloxy groups include compounds represented by the following formula, and compounds represented by the following formula with the proviso that some or all of methyl groups are replaced by ethyl groups, propyl groups, phenyl groups, trifluoropropyl groups or the like.

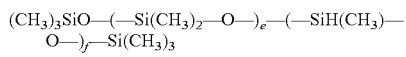
$(CH_3)_3SiO\text{—}(\text{—}Si(CH_3)_2\text{—}O\text{—})_e\text{—}(\text{—}SiH(CH_3)\text{—}O\text{—})_f\text{—}Si(CH_3)_3$ (wherein e is an integer of 1 or more, and f is an integer of 2 or more).

Examples of the methylhydrogenpolysiloxanes blocked at both molecular chain terminals by silanol groups include compounds represented by the following formula, and compounds represented by the following formula with the proviso that some or all of methyl groups are replaced by ethyl groups, propyl groups, phenyl groups, trifluoropropyl groups or the like.

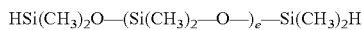
$HSi(CH_3)_2O\text{—}(Si(CH_3)_2\text{—}O\text{—})_e\text{—}Si(CH_3)_2H$ (wherein e is an integer of 1 or more).

Examples of the methylhydrogenpolysiloxanes blocked at both molecular chain terminals by dimethylhydrogensiloxy groups include compounds represented by the following formula, and compounds represented by the following formula with the proviso that some or all of methyl groups are replaced by ethyl groups, propyl groups, phenyl groups, trifluoropropyl groups or the like.

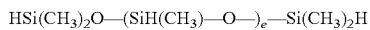
$HSi(CH_3)_2O\text{—}(SiH(CH_3)\text{—}O\text{—})_e\text{—}Si(CH_3)_2H$ (wherein e is an integer of 1 or more).

Examples of the dimethylsiloxane-methylhydrogensiloxane copolymers blocked at both molecular chain terminals by dimethylhydrogensiloxy groups include compounds represented by the following formula, and compounds represented by the following formula with the proviso that some or all of methyl groups are replaced by ethyl groups, propyl groups, phenyl groups, trifluoropropyl groups or the like.

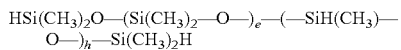
$HSi(CH_3)_2O\text{—}(Si(CH_3)_2\text{—}O\text{—})_e\text{—}(\text{—}SiH(CH_3)\text{—}O\text{—})_h\text{—}Si(CH_3)_2H$ (wherein each of e and f is an integer of 1 or more).

The above compounds can be produced by a known method. For example, such a compound can be easily obtained in the following manner: octamethylcyclotetrasiloxane and/or tetramethylcyclotetrasiloxane are equilibrated at a temperature of about −10° C. to +40° C. in the presence of a catalyst such as sulfuric acid, trifluoromethanesulfonic acid or methanesulfonic acid with a compound containing a triorganosilyl group or a diorganohydrogensiloxy group such as hexamethyldisiloxane or 1,3-dihydro-1,1,3,3-tetramethyldisiloxane which can be a terminal group.

Preferably, the amount of the hydrosilyl group-containing compound (Y) according to the present invention is typically 0.1 to 100 parts by weight, preferably 0.1 to 75 parts by weight, more preferably 0.1 to 50 parts by weight, still more preferably 0.2 to 30 parts by weight, furthermore preferably 0.2 to 20 parts by weight, especially preferably 0.5 to 10 parts by weight, most preferably 0.5 to 5 parts by weight based on 100 parts by weight of a polymer having a terminal double bond, preferably the ethylene/α-olefin/non-conjugated polyene copolymer (S). Use of the hydrosilyl group-containing compound (Y) in an amount of more than 100 parts by weight is not preferable because cost efficiency is deteriorated.

<Platinum-Based Catalyst (Z)>

The platinum-based catalyst (Z) for hydrosilicon crosslinking for use in the present invention is an addition reaction catalyst, and may be used without being particularly limited as long as the platinum-based catalyst promotes addition reaction of an alkenyl group of a polymer having a terminal double bond, preferably the ethylene/α-olefin/non-conjugated polyene copolymer (S), with a hydrosilyl group of the hydrosilyl group-containing compound (Y) (hydrosilylation reaction of alkene).

The specific platinum-based catalyst may be a known platinum-based catalyst which is typically used for curing of addition curing type, and examples thereof include a fine powder metal platinum catalyst as described in U.S. Pat. No. 2,970,150, a platinic chloride catalyst as described in U.S. Pat. No. 2,823,218, a complex compound of platinum with a hydrocarbon as described in U.S. Pat. Nos. 3,159,601 and 3,159,662, a complex compound of chloroplatinic acid with an olefin as described in U.S. Pat. No. 3,516,946, and a complex compound of platinum with vinylsiloxane as described in U.S. Pat. Nos. 3,775,452 and 3,814,780.

More specific examples of the platinum-based catalyst include elemental platinum (platinum black), chloroplatinic acid, platinum-olefin complexes, platinum-alcohol complexes, or carriers of alumina, silica or the like with a platinum carrier carried thereon.

The platinum-based catalyst (Z) for hydrosilicon crosslinking is used in an amount of typically 0.1 to 100000 ppm by weight, 0.1 to 10000 ppm by weight, more preferably 1 to 5000 ppm by weight, especially preferably 5 to 1000 ppm by weight based on the amount of a polymer having a terminal double bond, preferably the ethylene/α-olefin/non-conjugated polyene copolymer (S). When the amount of the platinum-based catalyst is less than 0.1 ppm by weight, the crosslinking rate tends to decrease, and use of the platinum-based catalyst in an amount of more than 100000 ppm by weight is not preferable because cost efficiency is deteriorated. When the platinum-based catalyst (Z) for hydrosilicon crosslinking is used in an amount within the above-described range, it is possible to obtain an ethylene/α-olefin/non-conjugated polyene copolymer composition which enables formation of a crosslinked molded article having a moderate crosslinking density, and an excellent strength property and elongation property.

<Reaction Inhibitor (D)>

The reaction inhibitor (D) for use in the present invention inhibits crosslinking reaction (hydrosilylation addition reaction to alkene) of an alkenyl group of a polymer having a terminal double bond, preferably the ethylene/α-olefin/non-conjugated polyene copolymer (S), with a hydrosilyl group of the hydrosilyl group-containing compound (Y). Inhibition of the crosslinking reaction is required for stabilizing processability during kneading and molding.

Examples of the reaction inhibitor (D) for use in the present invention include benzotriazole, ethynyl group-containing alcohols (e.g. ethynylcyclohexanol), acrylonitrile, amide compounds (e.g. N,N-diallylacetamide, N,N-diallyl-benzamide, N,N,N',N'-tetraallyl-o-phthalic acid diamide, N,N,N',N'-tetraallyl-m-phthalic acid diamide and N,N,N', N'-tetraallyl-p-phthalic acid diamide), sulfur, phosphorus, nitrogen, amine compounds, sulfur compounds, phosphorus compounds, tin, tin compounds, tetramethyltetravinylcyclotetrasiloxane, and organic peroxides such as hydroperoxide.

The reaction inhibitor (D) is used in an amount of typically 0.05 to 5 parts by weight, preferably 0.07 to 5 parts by weight, more preferably 0.07 to 4.5 parts by weight, still more preferably 0.1 to 4.5 parts by weight, especially preferably 0.1 to 3.0 parts by weight, most preferably 0.1 to 1.0 parts by weight based on 100 parts by weight of a polymer having a terminal double bond, preferably the ethylene/α-olefin/non-conjugated polyene copolymer (S). When the amount of the reaction inhibitor (D) is less than 0.05 parts by weight, the crosslinking rate may be excessively high, and when the reaction inhibitor (D) is used in an amount of more than 5 parts by weight, crosslinking may hardly occur due to an increased reaction inhibition effect.

<Other Compounding Agents>

In addition to the above-described essential compounding agents, other components such as a reinforcing agent, an inorganic filler, a softening agent, an anti-aging agent (stabilizer), a processing aid, a foaming agent, a foaming aid, a plasticizer, a colorant, other rubber compounding agents, rubber and resin may be optionally compounded in the polymer composition according to the present invention. The type and the content of each of the compounding agents are appropriately selected according to a use purpose, and among these agents, a reinforcing agent, an inorganic filler, a softening agent and the like are particularly preferably used.

In the present invention, examples of the resin which is optionally used include general-purpose resins such as polyethylene, polypropylene and polystyrene. In the present invention, as the rubber which is optionally used, silicone rubber, ethylene/propylene random copolymer rubber (EPR), natural rubber, styrene/butadiene rubber, isoprene rubber, butadiene rubber, chloroprene rubber and the like may be compounded. Rubber (EPT) which is different from but similar to the copolymer (A) may be used, or even two or more of the copolymers (A) may be used in mixture as long as the copolymers (A) have different iodine values, intrinsic viscosities [η] or molar ratios of ethylene to the α-olefin having 3 to 20 carbon atoms. In particular, when two or more of the copolymers (A) having different intrinsic viscosities [η] are used in mixture, a component having a low intrinsic viscosity and a component having a high intrinsic viscosity may be mixed.

<Polymer Composition>

The polymer composition according to the present invention is a composition containing a polymer having a terminal double bond, preferably the ethylene/α-olefin/non-conjugated polyene copolymer (S), the hydrosilyl group-containing compound (Y), the platinum-based catalyst (Z) and the reaction inhibitor (D).

The preferred amount of each component present in the polymer composition according to the present invention is as described above.

<Method for Producing Crosslinked Molded Article and Crosslinked Molded Article>

The method for producing a crosslinked molded article according to the present invention is a method for producing a molded article, including melt-kneading the polymer composition according to the present invention at a temperature in the range of typically 50 to 130° C., preferably 70 to 110° C., subjecting the polymer composition to injection molding in a mold set at a temperature in the range of typically 90 to 220° C. or 100 to 200° C., preferably 110 to 190° C., performing first-stage crosslinking (primary crosslinking) in the mold, subsequently removing the injection-molded article from the mold, and then performing second-stage crosslinking (secondary crosslinking) in a heat medium or the like. The time of the primary crosslinking performed in the mold is typically 0.5 to 60 seconds, preferably 0.6 to 40 seconds, more preferably about 0.7 to 20 seconds.

When a heat medium such as heated air is used for the secondary crosslinking, the temperature of the heat medium is typically 90 to 220° C., preferably 100 to 200° C., and the time of the secondary crosslinking (time of heating in the heat medium) is typically 5 to 120 minutes, preferably 10 to 60 minutes.

In the present invention, primary crosslinking is performed in a short time as described above, and thus the time of crosslinking in the mold can be reduced, so that the cycle of injection molding can be shortened to enhance production efficiency.

In the method for melt-kneading the polymer composition in the method for producing a molded article according to the present invention, a predetermined amount of a polymer having a terminal double bond, preferably the ethylene/α-olefin/non-conjugated polyene copolymer (S), etc. may be weighed and fed into an extruder of an injection molding machine, and then melt-kneaded at a temperature in the above-described range, or alternatively, a predetermined amount of a polymer having a terminal double bond, preferably the ethylene/α-olefin/non-conjugated polyene copolymer (S), etc. may be weighed, then melt-kneaded beforehand using a Banbury mixer, a kneader, or an internal mixer such as Inter Mix, and put in an injection molding machine.

The method for performing secondary crosslinking of a molded article in the method for producing a molded article according to the present invention can be carried out using, for example, hot air, a glass bead fluidized bed, an UHF (ultrahigh frequency electromagnetic wave), steam, or a heating-type crosslinking bath such as a LCM (thermally molten salt bath). It is preferable that heating in the secondary crosslinking be performed at a relatively low rate using a heat medium such as heated air or heated water vapor in an oven or the like because crosslinking is apt to evenly progress, so that the difference between the crosslinking density of the surface part and the crosslinking density of the inner part of the crosslinked molded article can be controlled to be small. The secondary crosslinking process may be a batch-type process or a continuous-type process. A radiation such as light, a γ-ray or an electron beam may be applied at the time of performing heating. In the present invention, secondary crosslinking is performed, and thus without being held in the mold for a long time, the crosslinked molded article can be evenly crosslinked to the inner part, so that it is possible to obtain a crosslinked molded article having a small difference in crosslinking density between the central part and the surface part of the molded article.

The crosslinked molded article according to the present invention includes the polymer composition described above, and preferably satisfies the following requirement (I). Requirement (I): provided that (x) is a point at the center of the crosslinked molded article, (z) is a point, which is at the shortest distance from the point (x), on the surface of the crosslinked molded article, and (y) is a point at which a line segment connecting the point (x) and the point (z) is internally divided in a ratio of 2:1, the surface crosslinking density (A) of the crosslinked molded article from the point (z) to the point (y) and the internal crosslinking density (B) of the crosslinked molded article from the point (x) to the point (y) satisfy the following relational Formula (7).

$$(A)/(B)<1.10 \qquad \text{Formula (7)}$$

More preferably, the crosslinked molded article of the present invention satisfies the following relational Formula (7').

$$(A)/(B)<1.09 \qquad \text{Formula (7')}$$

Here, the center of the crosslinked molded article means a point which is the farthest from a mold contacting surface during primary crosslinking.

For example, when the crosslinked molded article has a plate shape, the center is on the surfaces formed by dividing the article in a thickness direction into two equal parts. When the plate-shaped crosslinked molded article is divided in a thickness direction into three equal parts: a surface part/an inner part/a surface part, it is preferable that the crosslinking density (A) of the surface parts and the crosslinking density (B) of the inner part satisfy the above relational Formula (7), more preferably the above relational Formula (7').

Although the time for the crosslinking in a mold in injection molding is short, the crosslinked molded article of the present invention has a very small difference in crosslinking density between surface parts and the inner part, and has uniform and stable mechanical properties, and particularly small compression set.

The crosslinked molded article of the present invention are suitably used for hoses, tire rubber, O-rings, industrial rolls, packings (e.g. capacitor packings), gaskets, rubber cushions, vibration-proof materials or damping materials (e.g. engine mounts and motor mounts), muffler hangers, sponges (e.g. heat insulation sponges, protecting sponges and slightly foamed sponges), color skin materials, sheet feeding rolls and the like, for example. The crosslinked molded article is suitably used particularly for automobile interior and exterior components, and applications in which heat resistance is required, and the crosslinked molded article is suitable for hoses, O-rings, packings, sponges, rubber cushions, and sponges.

EXAMPLES

The present invention will be described in further detail below on the basis of Examples, which should not be construed as limiting the present invention.

The physical properties of ethylene/α-olefin/non-conjugated polyene copolymers used in Examples and Comparative Examples were measured by the following methods.
<Ethylene/α-Olefin/Non-Conjugated Polyene Copolymer>
(1) Composition of Ethylene/α-Olefin/Non-Conjugated Polyene Copolymer The weight fraction (wt %) of each structural unit and the molar ratio of ethylene/α-olefin in the ethylene/α-olefin/non-conjugated polyene copolymer were determined from values measured by $^{13}$C-NMR. The measured values were obtained by measuring the $^{13}$C-NMR spectrum of the copolymer at a measurement temperature of 120° C. and a cumulated number of 8000 times with ortho-dichlorobenzene/deuterated benzene=4/1 as a measurement solvent using Model ECX400P Nuclear Magnetic Resonance Apparatus (manufactured by JEOL Ltd.)
(2) Intrinsic Viscosity [η]

The intrinsic viscosity [η] (dl/g) was measured at a temperature of 135° C. with decalin as a measurement solvent using a full-automatic intrinsic viscosity meter manufactured by Rigo Co., Ltd.

(3) Weight Average Molecular Weight (Mw), Number Average Molecular Weight (Mn) and Molecular Weight Distribution (Mw/Mn)

The weight average molecular weight (Mw), the number average molecular weight (Mn) and the molecular weight distribution (Mw/Mn) are polystyrene-equivalent values measured by gel permeation chromatography (GPC). The measurement apparatuses and conditions are as follows. The molecular weight was calculated on the basis of a conversion method with a standard curve prepared using commercially available monodisperse polystyrene.

Apparatus: gel permeation chromatograph (Model Alliance GP2000 manufactured by Waters Corporation)

Analyzer: Empower 2 (manufactured by Waters Corporation)

Columns: two TSKgel GMH6-HTs and two TSKgel GMH6-HTLs (7.5 mm I.D.×30 cm, manufactured by TOSOH CORPORATION)

Column temperature: 140° C.

Mobile phase: o-dichlorobenzene (containing 0.025% BHT)

Detector: differential refractometer (RI), flow rate: 1.0 mL/min

Amount injected: 400 μL

Sampling time interval: 1 s

Column correction: monodisperse polystyrene (manufactured by TOSOH CORPORATION)

Molecular weight conversion: traditional EPR conversion/calibration method with viscosity taken into consideration (4) Complex Viscosity η* and P Value The complex viscosity $\eta^*_{(\omega=0.01)}$ at a frequency ω of 0.01 rad/s, the complex viscosity $\eta^*_{(\omega=0.1)}$ at a frequency ω of 0.1 rad/s, the complex viscosity $\eta^*_{(\omega=10)}$ at a frequency ω of 10 rad/s and the complex viscosity $\eta^*_{(\omega=100)}$ at a frequency ω of 100 rad/s (the unit of each of the complex viscosities is Pa·sec) were measured at the condition of 190° C. and a strain of 1.0% using a viscoelasticity measuring apparatus (Ares manufactured by Rheometric Scientific, Inc.) as a rheometer.

From the obtained results, the P value, which is a ratio (η*ratio) of the complex viscosity $\eta^*_{(\omega=0.1)}$ to the complex viscosity $\eta^*_{(\omega=100)}$ ($\eta^*_{(\omega=0.1)}/\eta^*_{(\omega=100)}$), was calculated.

The measurement method for evaluation of the copolymer compositions used in Examples and Comparative Examples are as follows.

Production Example 1

Polymerization reaction of ethylene, butene and 5-vinyl-2-norbornene (VNB) was continuously carried out at 95° C. using a polymerization vessel having a volumetric capacity of 300 L and including a stirring blade.

As a polymerization solvent, hexane was used (feeding rate: 23.6 L/h). Ethylene, butene, VNB and hydrogen were continuously supplied to the polymerization vessel at feeding rates of 4.5 kg/h, 14.4 kg/h, 420 g/h and 40.0 NL/h, respectively.

Di(p-tolyl) methylene(cyclopentadienyl) (octamethyloctahydrodibenzofluorenyl)zirconium dichloride as a main catalyst was continuously supplied to the polymerization vessel at a feeding rate of 0.0052 mmol/h while the polymerization pressure and the polymerization temperature were maintained at 1.65 MPaG and 95° C., respectively. $(C_6H_5)_3CB(C_6F_5)_4$ (CB-3) as a cocatalyst and triisobutylaluminum (TIBA) as an organoaluminum compound were continuously supplied to the polymerization vessel at feeding rates of 0.026 mmol/h and 20 mmol/h, respectively.

In this way, a solution containing 18 mass % of an ethylene/butene/VNB copolymer formed from ethylene, butene and VNB was obtained. The polymerization reaction was stopped by adding a small amount of methanol in the polymerization reaction solution extracted from the lower part of the polymerization vessel, and the ethylene/butene/VNB copolymer was separated from the solvent by steam stripping treatment, and then dried overnight under reduced pressure at 80° C.

Through the above operation, the ethylene/butene/VNB copolymer (S-1) formed from ethylene, butene and VNB was obtained at a rate of 6.0 kg per hour.

The physical properties of the obtained copolymer (S-1) were measured by the above-described methods. Table 1 shows the results.

TABLE 1

| Copolymer | S-1 | |
|---|---|---|
| Ethylene/Propylene or butene [molar ratio] | 68/32 (butene) | |
| VNB-IV [g/100 g] | 3.3 | |
| VNB content [wt %] | 1.6 | |
| Mw | 178000 | |
| Mw × VNB content/100/Molecular weight of VNB | 22.5 | 4.5 or more and 40 or less |
| [η][dl/g] | 2.3 | |
| P value ($\eta^*_{(\omega=0.1)}/\eta^*_{(\omega=100)}$) | 29.1 | |
| $P/([\eta]^{2.9})$ | 1.7 | $P/([\eta]^{2.9}) <$ VNB content × 6 |
| | 9.6 | VNB content × 6 |
| $LCB_{1000C}$ | 0.14 | $LCB_{1000C} < 1 - 0.07 \times$ Ln (Mw) |
| $1 - 0.07 \times$ Ln (Mw) | 0.15 | |

<Hardness Test (Duro A Hardness)>

In accordance with JIS K 6253, the hardness (Type A Durometer, HA) of the crosslinked sheet was measured using six 2 mm crosslinked sheets each having a smooth surface, where the flat parts of the crosslinked sheets were stacked to a thickness of about 12 mm. It is to be noted that specimens having contaminants, bubbles or scratches were not used. The specimen had a dimension allowing the measurement to be performed with a press needle tip end positioned at a distance of 12 mm or more from the end of the specimen.

<Tensile Test>

In accordance with JIS K 6251, a tensile test was conducted under the condition of a measurement temperature of 23° C. and a tensile speed of 500 mm/min to measure the strength at break (TB) [MPa] and the elongation at break (EB) [%] of the sheet. Specifically, a sheet-shaped crosslinked molded article was punched to prepare a No. 3 dumbbell specimen as described in JIS K 6251 (2001). In accordance with a method specified in JIS K 6251, the specimen was subjected to a tensile test under the condition of a measurement temperature of 25° C. and a tensile speed of 500 mm/min to measure the tensile stress at break (TB) and the tensile elongation at break (EB).

<Crosslinking Density>

The crosslinking density ν was calculated from the following Flory-Rehner formula (a) incorporating equilibrium swelling. $V_R$ in the formula (a) was determined by swelling and extracting the crosslinked 2 mm sheet with toluene under the condition of 37° C. and 72 hours.

The surface crosslinking density (A) and the inner part crosslinking density (B) were determined in the following manner. A crosslinked molded article sheet prepared with a thickness of 2 mm was divided in a cross-sectional direction into three parts to obtain three 0.67 mm-thick sheets (two outer sheets and one inner sheet), and the surface part crosslinking density (A) and the inner part crosslinking density (B) were similarly measured using the outer sheets and the inner sheet, respectively.

[Math. 4]

$$\nu \text{ [Number/cc]} = \frac{v_R + \text{Ln}(1 - v_R) + \mu v_R^2}{-v_0(v_R^{1/3} - v_R/2)} \quad (a)$$

$V_R$: Volume fraction of pure rubber in swollen crosslinked rubber $V_0$: Molecular solvency of solvent (toluene) (108.15 cc@37° C.)

μ: Interaction constant between rubber and solvent (EPDM-Toluene: 0.49)

A: Avogadro number

<Compression Set (2 mm Crosslinked Sheet)>

Samples of 20×20 mm were prepared, and five of the samples were stacked to obtain a specimen.

The total height of five samples each subjected to dimension measurement was set to a sample height, and the specimen was compressed by 25% with respect to the height (about 10 mm) of the specimen before application of a load, set together with a compression plate holding tool in an oven at a specified temperature, and heat-treated for a specified time. Subsequently, the specimen was released, and allowed to cool for 30 minutes, the height of the specimen was then measured, and the compression set (%) was calculated from the following calculation formula.

compression set (%)={(t0−t1)/(t0−t2)}×100 t0: height of specimen before test t1: height of specimen heat-treated and allowed to cool for 30 minutes t2: height of specimen attached to measurement mold Reference Example 1

100 parts by mass of the ethylene/butene/VNB copolymer (S-1) obtained in Production Example 1 was roughly kneaded for 1 minute using a mixer (Model Mixtron BB-4 manufactured by Kobe Steel, Ltd.). To this were then added 40 parts by mass of carbon black (Asahi #60G manufactured by Asahi Carbon Co., Ltd.), 30 parts by mass of heavy calcium carbonate (WHITON manufactured by Shiraishi Calcium Kaisha, Ltd), 40 parts by mass of paraffin-based process oil (Diana Process PW-380 manufactured by Idemitsu Kosan Co., Ltd.) and 10 parts by mass of specially treated calcium oxide (VESTA PP manufactured by Inoue Calcium Corporation), and the resulting mixture was kneaded at 140° C. for 2 minutes. Thereafter, the ram was lifted to perform cleaning, and the mixture was further kneaded for 1 minute, and discharged at about 150° C. to obtain a compound.

The obtained compound was subjected to press crosslinking at 180° C. for 20 minutes to obtain a flat plate-shaped crosslinked molded article of 150×150×2 mm. Table 2 shows the physical properties of the obtained crosslinked molded article.

Examples 1 to 3

As a first stage, 100 parts by mass of the ethylene/butene/VNB copolymer (S-1) obtained in Production Example 1 was roughly kneaded for 1 minute using a mixer (Model Mixtron BB-4 manufactured by Kobe Steel, Ltd.). To this were then added 40 parts by mass of carbon black (Asahi #60G manufactured by Asahi Carbon Co., Ltd.), 30 parts by mass of heavy calcium carbonate (WHITON manufactured by Shiraishi Calcium Kaisha, Ltd), 40 parts by mass of paraffin-based process oil (Diana Process PW-380 manufactured by Idemitsu Kosan Co., Ltd.) and 10 parts by mass of specially treated calcium oxide (VESTA PP manufactured by Inoue Calcium Corporation), and the resulting mixture was kneaded at 140° C. for 2 minutes. Thereafter, the ram was lifted to perform cleaning, and the mixture was further kneaded for 1 minute, and discharged at about 150° C. to obtain a first-stage compound.

Next, as a second stage, the compound obtained in the first stage was wound around a 8 inch roll (manufactured by Nippon Roll MFG. Co., Ltd.) (surface temperature of front roll: 50° C., surface temperature of rear roll: 50° C., the rotation speed of the front roll: 16 rpm and the rotation speed of the rear roll: 18 rpm). To this were added 4 parts by weight of a hydrosilyl group-containing compound (manufactured by Shin-Etsu Chemical Co., Ltd.) (($CH_3$)$_3$SiO—(SiH($CH_3$)—O—)$_6$—Si($CH_3$)$_2$—O—Si($C_6H_6$)$_2$—O—Si($CH_3$)$_3$), 0.2 parts by mass of a platinum-based catalyst (manufactured by Shin-Etsu Chemical Co., Ltd.) (chloroplatinic acid+[$CH_2$=CH(Me)SiO]$_4$ complex) and 0.1 parts by mass of a reaction inhibitor (3,5-dimethyl-1-hexyl-3-ol), and the resulting mixture was kneaded for 10 minutes to obtain an uncrosslinked polymer compound (ethylene/α-olefin/non-conjugated polyene copolymer composition). The physical properties of the polymer compound were evaluated.

A flat plate mold of 150×150×2 mm was attached to a 75 t vertical injection (VI-75P(B)-40/60SPR5(500)-P manufactured by Matsuda Seisakusho Co., Ltd.), and injection molding was performed under the condition of a nozzle temperature of 90° C., a mold temperature of 180° C., an injection rate of 40 $cm^3$/sec, a mold clamping pressure of 135 kgf and a varied vulcanization time (as shown in Table 1).

The primary-crosslinked molded article obtained by the injection molding was subjected to secondary crosslinking at 180° C. for 30 minutes using a gear oven (product name: Temperature Chamber with Rotating Specimen Rack (Gear Oven), model: GPH-201, maker: ESPEC Corp.). The obtained crosslinked molded articles each had a good appearance.

Table 2 shows the physical properties of the crosslinked molded articles.

Comparative Examples 1 to 3

Except that as a crosslinking condition, crosslinking in a gear oven was not performed, the same procedure as in Example 1 was carried out.

The obtained crosslinked molded articles each had a good appearance. Table 2 shows the physical properties of the crosslinked molded articles.

TABLE 2

| | Reference Example | Comparative Example 1 | Comparative Example 2 | Comparative Example 3 | Example 1 | Example 2 | Example 3 |
|---|---|---|---|---|---|---|---|
| <Compounding> | | | | | | | |
| Polymer S-1 (VNB-EBDM) | 100 | 100 | 100 | 100 | 100 | 100 | 100 |
| Asahi #70G | 40 | 40 | 40 | 40 | 40 | 40 | 40 |
| BURGESS 30 | 30 | 30 | 30 | 30 | 30 | 30 | 30 |
| VESTA PP | 10 | 10 | 10 | 10 | 10 | 10 | 10 |
| PW-380 | 40 | 40 | 40 | 40 | 40 | 40 | 40 |
| Total | 220 | 220 | 220 | 220 | 220 | 220 | 220 |
| <Crosslinking agent> | | | | | | | |
| Hydrosilyl group-containing compound (crosslinking agent) | 4 | 4 | 4 | 4 | 4 | 4 | 4 |
| Platinum-based catalyst | 0.2 | 0.2 | 0.2 | 0.2 | 0.2 | 0.2 | 0.2 |
| Reaction inhibitor | 0.4 | 0.4 | 0.4 | 0.4 | 0.4 | 0.4 | 0.4 |
| <Viscosity of uncrosslinked compound> | | | | | | | |
| ML(1 + 4)100° C. | 29 | 29 | 29 | 29 | 29 | 29 | 29 |
| Crosslinking method | Press crosslinking | Only primary crosslinking: injection molding | | | Primary crosslinking: injection molding Secondary molding: oven heating | | |
| Primary crosslinking conditions | | 180° C. × 1 s | 180° C. × 3 s | 180° C. × 10 s | 180° C. × 1 s | 180° C. × 3 s | 180° C. × 10 s |
| Secondary crosslinking conditions | | None | None | None | 180° C. × 30 min | 180° C. × 30 min | 180° C. × 30 min |
| <Physical properties of vulcanized rubber> | | | | | | | |
| Hardness (Duro-A) | 56 | 46 | 46 | 48 | 54 | 54 | 56 |
| TB (MPa) | 6.6 | 6.8 | 6.7 | 6.9 | 5.8 | 6.1 | 6.2 |
| EB (%) | 264 | 535 | 533 | 503 | 216 | 221 | 209 |
| <Crosslinking density> | | | | | | | |
| Number/cc <Surface crosslinking density (A) (sheet outer part)> | 1.03E+20 | 4.06E+19 | 4.09E+19 | 4.46E+19 | 8.33E+19 | 7.78E+19 | 8.84E+19 |
| Number/cc <Internal crosslinking density (B) (sheet inner part)> | 1.06E+20 | 5.27E+19 | 5.77E+19 | 6.38E+19 | 8.50E+19 | 8.24E+19 | No data |
| Number/cc <Crosslinking density ratio of (A) to (B)> | 9.65E+19 1.10 | 1.54E+19 3.42 | 1.68E+19 3.44 | 2.01E+19 3.18 | 8.25E+19 1.03 | 7.62E+19 1.08 | No data |
| Compression set> (sheet sample) | | | | | | | |
| 150° C. × 22 h(%) | 25 | 74 | 70 | 68 | 21 | 23 | 24 |

Injection molding conditions: barrel (60° C.), plunger (90° C.), mold (180° C.)
Secondary vulcanization conditions: 180° C., 30 min
Sheet outer part: the 2 mm sheet is divided in a cross-sectional direction into three parts (0.67 mm), the outer parts are swollen with toluene, and the crosslinking density thereof is calculated.
Sheet inner part: the 2 mm sheet is divided in a cross-sectional direction into three parts (0.67 mm), the central part is swollen with toluene, and the crosslinking density thereof is calculated.

The invention claimed is:

1. A method for producing a crosslinked molded article, comprising the steps of:
    melt-kneading a polymer composition comprising a polymer having a terminal double bond, a hydrosilyl group-containing compound (Y) having at least two hydrosilyl groups per molecule, a platinum-based catalyst (Z) for hydrosilicon crosslinking, and a reaction inhibitor (D),
    subjecting the polymer composition to injection molding in a mold, performing primary crosslinking in the mold, removing a primary-crosslinked molded article from the mold, and
    then performing secondary crosslinking in a heat medium, and
    wherein the polymer having a terminal double bond is an ethylene/α-olefin/non-conjugated polyene copolymer (S) having structural units derived from ethylene (A), an α-olefin (B) having 3 to 20 carbon atoms, and a non-conjugated polyene (C) containing per molecule a total of two or more partial structures each selected from the group consisting of the structures of the following general formulae (I) and (II), and satisfying the following requirements (i) to (v):

[Chem. 1]

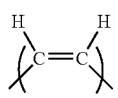

(I)

-continued (CH$_2$=CH)— (II) 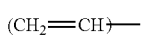

(i) a molar ratio of the ethylene/α-olefin is from 40/60 to 99.9/0.1,
(ii) a weight fraction of structural units derived from the non-conjugated polyene (C) is 0.07 wt % to 10 wt % based on 100 wt % of the ethylene/α-olefin/non-conjugated polyene copolymer (S);
(iii) a weight average molecular weight (Mw) of the ethylene/α-olefin/non-conjugated polyene copolymer (S), a weight fraction of structural units derived from the non-conjugated polyene (C) (weight fraction of (C) (wt %), and a molecular weight of the non-conjugated polyene (C) (molecular weight of (C)) satisfy the following Formula (1):

4.5≤Mw×weight fraction of (C)/100/molecular weight of (C)≤40   Formula (1);

(iv) a ratio P of a complex viscosity $\eta^*_{(\omega=0.1)}$ (Pa·sec) at a frequency ω of 0.1 rad/s to a complex viscosity $\eta^*_{(\omega=100)}$ (Pa·sec) at a frequency ω of 100 rad/s ($\eta^*_{(\omega=0.1)}/\eta^*_{(\omega=100)}$) where the complex viscosities are obtained by linear viscoelasticity measurement (190° C.) using a rheometer, an intrinsic viscosity [η] and the weight fraction of structural units derived from the non-conjugated polyene (C) (weight fraction of (C)) satisfy the following Formula (2):

P/([η]$^{2.9}$)≤weight fraction (C)×6   Formula (2); and (v) a number of long-chain branches per 1000 carbon atoms (LCB$_{1000C}$), which is obtained by using 3D-GPC, and a natural logarithm of the weight average molecular weight (Mw) represented by [Ln (Mw)] satisfy the following Formula (3):

LCB$_{1000C}$≤1−0.07×Ln (Mw)   Formula (3).

2. The method for producing a crosslinked molded article according to claim 1, wherein the polymer composition comprises the hydrosilyl group-containing compound (Y) in an amount of 0.1 to 100 parts by mass, the platinum-based catalyst (Z) in an amount of 0.1 to 100000 ppm by weight and the reaction inhibitor (D) in an amount of 0.05 to 5 parts by mass based on 100 parts by mass of the polymer having a terminal double bond.

3. The method for producing a crosslinked molded article according to claim 1, wherein a melt-kneading temperature is in a range of 50 to 130° C., a temperature of the mold is in a range of 90 to 220° C., and a temperature of the heat medium is in a range of 90 to 220° C.

4. The method for producing a crosslinked molded article according to claim 1, wherein a time for the primary crosslinking is in a range of 0.5 to 60 seconds.

5. A crosslinked molded article comprising a reaction product of a polymer composition comprising:
a polymer having a terminal double bond,
a hydrosilyl group-containing compound (Y) having at least two hydrosilyl groups per molecule;
a platinum-based catalyst (Z) for hydrosilicon crosslinking; and
a reaction inhibitor (D),
the crosslinked molded article satisfying the following Requirement (I):
Requirement (I): provided that (x) is a point at the center of the crosslinked molded article, (z) is a point, which is at the shortest distance from the point (x), on a surface of the crosslinked molded article, and (y) is a point at which a line segment connecting the point (x) and the point (z) is internally divided in a ratio of 2:1, a surface crosslinking density (A) of the crosslinked molded article from the point (z) to the point (y) and an internal crosslinking density (B) of the crosslinked molded article from the point (x) to the point (y) satisfy the following relational Formula (7):

(A)/(B)<1.10   Formula (7); and, wherein the polymer having a terminal double bond is an ethylene/α-olefin/non-conjugated polyene copolymer (S) having structural units derived from ethylene (A), an α-olefin (B) having 3 to 20 carbon atoms, and a non-conjugated polyene (C) containing per molecule a total of two or more partial structures each selected from the group consisting of the structures of the following general formulae (I) and (II); and satisfying the following requirements (i) to (v):

[Chem. 1]

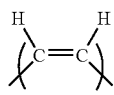 (I)

(CH$_2$=CH)— (II) 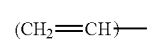

(i) a molar ratio of the ethylene/α-olefin is from 40/60 to 99.9/0.1;
(ii) a weight fraction of structural units derived from the non-conjugated polyene (C) is 0.07 wt % to 10 wt % based on 100 wt % of the ethylene/α-olefin/non-conjugated polyene copolymer (S);
(iii) a weight average molecular weight (Mw) of the ethylene/α-olefin/non-conjugated polyene copolymer (S), a weight fraction of structural units derived from the non-conjugated polyene (C) (weight fraction of (C) (wt %), and a molecular weight of the non-conjugated polyene (C) (molecular weight of (C)) satisfy the following Formula (1):

4.5≤Mw×weight fraction of (C)/100/molecular weight of (C)≤40   Formula (1);

(iv) a ratio P of a complex viscosity $\eta^*_{(\omega=0.1)}$ (Pa·sec) at a frequency ω of 0.1 rad/s to a complex viscosity $\eta^*_{(\omega=100)}$ (Pa·sec) at a frequency ω of 100 rad/s ($\eta^*_{(\omega=0.1)}/\eta^*_{(\omega=100)}$) where the complex viscosities are obtained by linear viscoelasticity measurement (190° C.) using a rheometer, an intrinsic viscosity [η] and the weight fraction of structural units derived from the non-conjugated polyene (C) (weight fraction of (C)) satisfy the following Formula (2):

P/([η]$^{2.9}$)≤weight fraction (C)×6   Formula (2); and (v) a number of long-chain branches per 1000 carbon atoms (LCB$_{1000C}$), which is obtained by using 3D-GPC, and a natural logarithm of the weight average molecular weight (Mw) represented by [Ln (Mw)] satisfy the following Formula (3):

LCB$_{1000C}$≤1−0.07×Ln (Mw)   Formula (3).

* * * * *